United States Patent
Liu et al.

(10) Patent No.: US 12,037,287 B2
(45) Date of Patent: Jul. 16, 2024

(54) HIGH-ADAPTABILITY VISCOSITY-REDUCING POLYCARBOXYLIC ACID WATER REDUCER, PREPARATION METHOD THEREFOR AND USE THEREOF

(71) Applicants: SOBUTE NEW MATERIALS CO., LTD., Nanjing (CN); NANJING BOTE NEW MATERIALS CO., LTD., Nanjin (CN)

(72) Inventors: Jiaping Liu, Nanjing (CN); Shentong Li, Nanjing (CN); Qianping Ran, Nanjing (CN); Yong Yang, Nanjing (CN); Xin Shu, Nanjing (CN); Dongliang Zhou, Nanjing (CN); Jinzhi Liu, Nanjing (CN); Jiangang Zhang, Nanjing (CN)

(73) Assignees: SOBUTE NEW MATERIALS CO., LTD, Nanjing (CN); NANJING BOTE NEW MATERIALS CO., LTD., Nanjing (CN)

( * ) Notice: Subject to any disclaimer, the term of this patent is extended or adjusted under 35 U.S.C. 154(b) by 848 days.

(21) Appl. No.: 17/044,303

(22) PCT Filed: Apr. 18, 2019

(86) PCT No.: PCT/CN2019/083140
§ 371 (c)(1),
(2) Date: Sep. 30, 2020

(87) PCT Pub. No.: WO2020/140342
PCT Pub. Date: Jul. 9, 2020

(65) Prior Publication Data
US 2021/0163355 A1    Jun. 3, 2021

(30) Foreign Application Priority Data
Dec. 31, 2018  (CN) .......................... 201811650936.3

(51) Int. Cl.
| C08G 16/02 | (2006.01) |
| C04B 24/24 | (2006.01) |
| C04B 24/30 | (2006.01) |
| C04B 24/32 | (2006.01) |
| C04B 103/30 | (2006.01) |

(52) U.S. Cl.
CPC ............ *C04B 24/246* (2013.01); *C04B 24/30* (2013.01); *C04B 24/32* (2013.01); *C08G 16/0243* (2013.01); *C04B 2103/302* (2013.01); *C08G 16/0231* (2013.01)

(58) Field of Classification Search
None
See application file for complete search history.

(56) References Cited

U.S. PATENT DOCUMENTS

| 10,745,510 | B2 * | 8/2020 | Liu ....................... C04B 24/243 |
| 2007/0039516 | A1 | 2/2007 | Bandoh |
| 2010/0286345 | A1 * | 11/2010 | Sato ................... C08G 59/5033 |
| | | | 252/182.13 |

FOREIGN PATENT DOCUMENTS

| CN | 104177557 A | 12/2014 |
| CN | 104262550 A | 1/2015 |
| CN | 105367721 A | 3/2016 |
| CN | 105646871 A | 6/2016 |
| CN | 106397683 A | 2/2017 |
| CN | 108264619 A | 7/2018 |
| JP | 06127993 A | 5/1994 |

* cited by examiner

*Primary Examiner* — Richard A Huhn
(74) *Attorney, Agent, or Firm* — Treasure IP Group, LLC

(57) ABSTRACT

Disclosed are a highly adaptable viscosity-reducing polycarboxylate water reducer and its preparation method and application. The highly adaptable viscosity-reducing polycarboxylate water reducer is composed of a polymer and water, and the polymer accounts for 30-50 wt %; since the main chain of the polymer contains a hydrophobic benzene ring and hydrophilic amine, the polymer has strong rigidity and good solubility in an aqueous solution, and is rich in two adsorption groups of carboxyl group/phosphono group. The highly adaptable viscosity-reducing polycarboxylate water reducer of the present invention has excellent water-reducing and slump retention properties and is suitable for general construction projects and commercial concrete projects. Compared with the conventional polycarboxylate water reducer, the highly adaptable viscosity-reducing polycarboxylate water reducer of the present invention has strong adaptability to concrete materials and can effectively reduce the viscosity of high-strength concrete (C50-C100), thus having bright application prospects in the high-end water reducer market.

9 Claims, No Drawings

HIGH-ADAPTABILITY VISCOSITY-REDUCING POLYCARBOXYLIC ACID WATER REDUCER, PREPARATION METHOD THEREFOR AND USE THEREOF

CROSS REFERENCE TO RELATED APPLICATION

This application claims priority to a PCT application PCT/CN2019/083140 filed on Apr. 18, 2019, which in turn claims priority to a Chinese Application No. 201811650936.3, filed on Dec. 31, 2018. The PCT and Chinese Applications are incorporated herein by reference in their entireties.

BACKGROUND OF THE INVENTION

Technical Field

The present invention belongs to the technical field of concrete admixtures, in particular to a highly adaptable viscosity-reducing polycarboxylate water reducer, and its preparation method and application.

Description of Related Art

Polycarboxylate water reducers are one of the most widely studied and applied concrete admixtures. When the workability of concrete is unchanged, the addition of polycarboxylate water reducers can effectively save the use of cement, reduce water consumption, and improve the strength of cement. In terms of molecular structure, polycarboxylates are comb-shaped polymers. A polycarboxylate consists of a main chain rich in carboxyl groups and polyether side chains. The carboxyl groups on the main chain can be directionally adsorbed on the surface of positively charged cement or cement hydrate, and the polyether side chains stretch in a solution to form a hydrated layer to provide a space repulsive force to prevent cement agglomeration. Therefore, this structure gives the Polycarboxylate a strong ability to disperse cement particles.

In 1981, T. Hirata of the Japanese catalyst company applied for the first patent on polycarboxylates (JP 842022 (S59-018338)). Since then, universities and enterprises have begun to study polycarboxylates, and a large number of patents on polycarboxylate products have been applied around the world. For example, U.S. Pat. No. 7,855,260, owned by German BASF Company, reported a novel polycarboxylate water reducer prepared by copolymerization of vinyl polyether with high molecular weight and acrylic acid. This product not only has better slump retention performance than conventional polycarboxylate water reducers, but also can improve the early strength of concrete. Patent EP1061089, owned by Swiss Sika Company, reported a novel acylamino-containing polycarboxylate water reducer prepared by dehydration reaction of polyacrylic acid and amino polyether. This product not only has excellent slump retention, reinforcement and anti-shrinkage functions in concrete applications, but also can effectively prevent corrosion of reinforcement.

The polycarboxylate water reducers have gone through more than 30 years from conception to product improvement. The extensive application of polycarboxylate products has also made outstanding contributions to the development of modern concrete technology. However, the existing polycarboxylate products still have many technical requirements that are difficult to meet. There are two outstanding problems. One is the adaptability of the polycarboxylate water reducers to concrete materials is poor; because cement, sand and other materials have strong regionality, a polycarboxylate product may perform excellent in a certain place, but its performance in other regions is greatly reduced, which requires the development of a highly adaptable polycarboxylate product which can be widely used throughout the country to reduce production and application costs. The other problem is that the project urgently needs a polycarboxylate product that can significantly reduce the viscosity of concrete; since the modern buildings are becoming high-rise and complicated, the demand for high-strength concrete is increasing; however, since the high-strength concrete has low water-cement ratio and high viscosity, it is difficult to pump concrete, which seriously affects the construction efficiency. Therefore, the market urgently needs a viscosity-reducing polycarboxylate water reducer for high-strength concrete. In response to these two problems, some references and patents have reported some useful technical solutions.

Patent CN 104177557 B discloses a preparation method of a highly adaptable polycarboxylate water reducer. By using unsaturated carboxylic acid, unsaturated sulfonic acid, unsaturated phosphonic acid and unsaturated polyether as monomers, the free-radical copolymerization reaction results in the water reducer product which has small fluctuations in the water-reducing rate among different cement materials, reflecting its good cement adaptability. However, this method introduces a large amount of unsaturated sulfonic acid monomers and unsaturated phosphonic acid monomers that are difficult to undergo free radical copolymerization, and this reduces the conversion rate of raw materials, which makes the water-reducing performance of the product much lower than that of general polycarboxylate water reducers. In addition, the cost of unsaturated phosphonic acid monomers is high. All these reasons make it difficult to promote the application of this product in actual projects.

Patent CN 104262550 A discloses a preparation method of a viscosity-reducing polycarboxylate water reducer. First, an unsaturated primary amine is synthesized by reacting a small monomer containing an unsaturated double bond with a binary primary amine, and then quaternized to obtain an unsaturated small monomer of quaternary ammonium salt, and finally the unsaturated small monomer of quaternary ammonium salt is copolymerized with an unsaturated ester monomer, an unsaturated acid monomer and an unsaturated polyester macromonomer to obtain the water reducer product. Although this product has a certain viscosity-reducing function, the preparation process for preparing the quaternary ammonium salt monomer is cumbersome, costly, and thus it is difficult to industrialize the preparation process.

Patent CN 105367721 B provides a preparation method of viscosity-reducing polycarboxylate water reducer. In the polymerization system of conventional unsaturated acid and polyether, by introducing a branched polyether monomer and a rigid hydrophobic monomer to adjust the molecular conformation of the polycarboxylate, the steric hindrance of the side chains become larger and the thickness of the hydration film is increased, thus giving the product the function of reducing the viscosity of concrete. However, this method requires the use of a branched polyether as the monomer, which is costly and achieves a limited viscosity reduction effect, and the resulting product has a low cost performance.

Patent US 2007/0039516A1 discloses a preparation method of a viscosity-reducing polycarboxylate water reducer. First, a polyamide-imine polymer is obtained by the dehydration condensation reaction of a polyamine compound and a dibasic acid; next, the polyamide-imine polymer is dehydrated with an unsaturated acid to obtain a polyamide-imine polymer containing a carbon-carbon double bond at the end; and then, the polyamide-imine polymer undergoes a ring-opening reaction with ethylene oxide to obtain a polyamide-amine ether macromonomer, and finally the macromonomer is copolymerized with an unsaturated acid to obtain the water reducer product. Obviously, the method is cumbersome, the raw material cost is high, and it is likely to produce a diene-based macromonomer when the unsaturated acid reacts with the polyamide-imine, which will cause the system to crosslink gel during the last step of free radical polymerization. All these factors are not conducive to industrial-scale production.

Most of the technical methods reported in the above patents have the disadvantages of high raw material cost, complicated production process, difficulty in industrialization, and insignificant performance improvement. Therefore, it is necessary to develop a novel water reducer product with simple process, low cost and excellent performance, in order to solve such the problems of the polycarboxylate water reducer encountered in the actual project as poor adaptability to materials and failure in reducing the viscosity of high-strength concrete.

BRIEF SUMMARY OF THE INVENTION

The present invention provides a highly adaptable viscosity-reducing polycarboxylate water reducer and its preparation method and application. The highly adaptable viscosity-reducing polycarboxylate water reducer has excellent water-reducing and slump retention properties and is suitable for general construction projects and commercial concrete projects. Compared with the conventional polycarboxylate water reducer, the highly adaptable viscosity-reducing polycarboxylate water reducer of the present invention has strong adaptability to concrete materials and can effectively reduce the viscosity of high-strength concrete (C50-C100), thus having bright application prospects in the high-end water reducer market.

The highly adaptable viscosity-reducing polycarboxylate water reducer of the present invention is composed of a polymer and water, and the polymer accounts for 30-50 wt %; since the main chain of the polymer contains a hydrophobic benzene ring and hydrophilic amine, the polymer has strong rigidity and good solubility in an aqueous solution, and is rich in two adsorption groups of carboxyl group/phosphono group.

The polymer of the highly adaptable viscosity-reducing polycarboxylate water reducer of the present invention is composed of a main chain rich in carboxyl groups and phosphono groups, and polyether side chains. The side chains are the same as those of conventional water reducers, and they are ordinary polyether segments; however, the main chain is prepared by polycondensation reaction among an aromatic compound, a polyamine compound and an alkyl aldehyde, which is very different from the flexible carbon-hydrogen main chain of conventional water reducers.

The aromatic compound has highly hydrophobic benzene rings, which can impart strong rigidity to the main chain in an aqueous solution, while the polyamine compound contains amino groups with strong hydrophilicity, which can impart a strong flexibility to the main chain and take a solubilizing effect.

In the present invention, the aromatic compound and the polyamine compound form the main chain through polycondensation reaction in the presence of the alkyl aldehyde functioning as bridging molecules. The aromatic compound and the polyamine compound are randomly distributed in the main chain, so that the carboxyl groups/phosphono groups contained in the aromatic compound can be evenly distributed on the main chain.

Since the conventional water reducer has strong main chain flexibility, the molecules of the water reducer are obviously entangled in the aqueous solution, so that most of the carboxyl groups are embedded inside the molecules, cannot effectively form an adsorption layer with cement particles, thereby affecting the water-reducing and slump retention properties. However, the highly adaptable viscosity-reducing polycarboxylate water reducer of the present invention has strong main chain rigidity and good molecular stretch of the main chain, so that most of the adsorbed groups (phosphono groups/carboxyl groups) can be exposed out of the molecules, so that the adsorption of water reducer molecules on cement particles is more tight, which can greatly improve the ability of water reduction and slump retention. Moreover, the strong rigidity of the main chain will also reduce the degree of entanglement of the flexible polyether side chains, significantly increase the thickness of the hydration layer formed by the side chains, delay the hydration agglomeration of cement particles, and effectively reduce the viscosity of the cement mortar. In addition, the highly adaptable viscosity-reducing polycarboxylate water reducer of the present invention contains two adsorption groups of carboxyl group and phosphono group. Mixed adsorption groups will not only enhance the adsorption capacity of molecules, but also improve the product's adaptability to concrete materials.

The present invention provides a preparation method of a highly adaptable viscosity-reducing polycarboxylate water reducer. First, a linear main chain polymer is prepared by a polycondensation reaction from monomer A, monomer B, monomer C, and aldehyde D; and then polyether macromonomer E is grafted onto the main chain through chemical bonding to form a comb-shaped polymer, thereby obtaining the highly adaptable viscosity-reducing polycarboxylate water reducer described in the present invention.

The monomer A is a hydroxybenzoic acid monomer, which may be any one of o-hydroxybenzoic acid, m-hydroxybenzoic acid, p-hydroxybenzoic acid, 2,3-dihydroxybenzoic acid, and 3,4-dihydroxybenzoic acid or a combination of more than two of o-hydroxybenzoic acid, m-hydroxybenzoic acid, p-hydroxybenzoic acid, 2,3-dihydroxybenzoic acid, and 3,4-dihydroxybenzoic acid in any ratio.

The monomer B is a phenylphosphonic acid monomer which is represented by a structural formula B-1 or B-2:

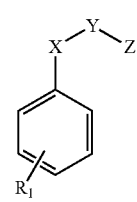

B-1

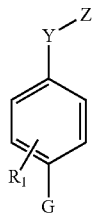

wherein X represents O or $NR_2$, Y represents alkylene with 1 to 4 carbon atoms, Z represents $N(CH_2PO_3H_2)_2$, $NHCH_2PO_3H_2$, $NR_3CH_2PO_3H_2$, $C(OH)(PO_3H_2)_2$, $CH(OPO_3H_2)CH_2OPO_3H_2$ or $OPO_3H_2$, $R_1$ represents alkyl with 1 to 4 carbon atoms, G represents OH or $NR_4$, and $R_2$, $R_3$, and $R_4$ independently represent alkyl with 1 to 4 carbon atoms;

The monomer A contains carboxyl groups, and the monomer B contains phosphono groups. The monomers A and B together provide adsorption groups for the polymer. The monomer A can be obtained commercially, and the monomer B can be prepared by phosphonication of aromatic compounds containing amino groups, carboxyl groups, and hydroxyl groups. For related synthesis technologies, reference may be made to the patent (CN 105646871A)

The monomer C is a polyamine compound, which is any one of m-xylylenediamine, ethylenediamine, diethylenetriamine, triethylenetetramine, and tetraethylenepentamine or a combination of more than two of m-xylylenediamine, ethylenediamine, diethylenetriamine, triethylenetetramine, and tetraethylenepentamine in any ratio;

The aldehyde D is an alkyl aldehyde such as formaldehyde, acetaldehyde, propionaldehyde, or paraformaldehyde;

The polyether macromonomer E is a polyethylene glycol monomethyl ether containing a special group at the end, which is presented by a structural formula E-1 or E-2:

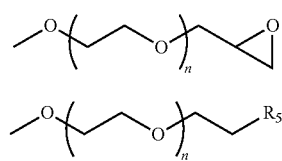

wherein $R_5$ represents Cl or Br, n represents the number of repeating units with the specific value of 11-113, and the molecular weight of the polyether macromonomer E is 500-5000;

The ends of the polyether macromonomer E contain epoxy or halogen groups which can react with the active hydrogen on the amino group, so that the polyether monomer E can be grafted onto the polymer main chain containing the amino group;

The preparation method of the highly adaptable viscosity-reducing polycarboxylate water reducer specifically has the following two steps:
(1) Preparation of main chain: adding monomer A, monomer B, monomer C and a solvent (water) to a reaction flask, mixing evenly, heating to 100-150° C., and then dropwise adding an aqueous solution of aldehyde D to the reaction system, and reacting for 8-16 h to obtain a main chain polymer, wherein the molar ratio of the monomer A to monomer B to monomer C is 1:0.2-1.5:0.1-1.5;

the molar amount of the aldehyde D is 105-110% of the total molar amount of the monomers A, B, and C, if the molar amount of the aldehyde D is too little, it will result in incomplete reaction, and if molar amount of the aldehyde D is too much, it will cause waste and will not improve product performance;

the solvent (water) accounts for 20-60 wt % of the total mass of the monomers A, B, and C; the aqueous solution of aldehyde is a conventional aqueous solution of aldehyde, and the concentration of an industrial aldehyde solution is 37-40%.

(2) introduction of side chains: cooling the main chain polymer prepared in step (1) to 30-80° C., and then adding the polyether macromonomer E, holding the temperature and carrying out the reaction for 2-6 hours to obtain the highly adaptable viscosity-reducing polycarboxylate water reducer of the present invention, wherein the molar ratio of the polyether macromonomer E to the monomer C in step (1) is 1-4:1;

Step (1) is the Mannich condensation reaction of phenalkamine, the specific reaction principle can be found in the Reference (Journal of Applied Polymer Science, 2018, 135 (3) or Macromolecules, 2005, 38(15): 6240-6243).

The weight-average molecular weight $M_w$ of the highly adaptable viscosity-reducing polycarboxylate water reducer of the present invention is controlled between 20,000 and 80,000. If the molecular weight is too large or too small, the product performance will be deteriorated.

The dosage of the highly adaptable viscosity-reducing polycarboxylate water reducer of the present invention is 0.05% to 0.3% of the mass of the total gelling material, the dosage refers to the pure solid dosage, and the percentage refers to the mass percentage. A too low dosage will deteriorate its performance, and a too high dosage will cause economic waste and a failure in performance improvement.

The highly adaptable viscosity-reducing polycarboxylate water reducer of the present invention may be used together with other commercially available water reducers, such as lignosulfonate water reducers, naphthalene sulfonate water reducers, polycarboxylate water reducers, may also be used after being mixed with an air-entraining agent, a retarder, an early strength agent, an expanding agent, a tackifier, a shrinkage reducing agent and a defoaming agent.

The beneficial effects of the present invention are as follows:
(1) The highly adaptable viscosity-reducing polycarboxylate water reducer described in the present invention has a high water reduction rate and good slump retention performance, and can effectively reduce the cost of single concrete after being applied to actual projects;
(2) The highly adaptable viscosity-reducing polycarboxylate water reducer of the present invention has low sensitivity to cement, sand and other materials, and has strong adaptability. Its working performance will not fluctuate greatly due to different regional materials. So the highly adaptable viscosity-reducing polycarboxylate water reducer can be widely sold nationwide as a universal water reducer.
(3) The highly adaptable viscosity-reducing polycarboxylate water reducer of the present invention can effectively reduce the viscosity of high-strength concrete (C50-C100), which is conducive to pumping construction, and thus the water reducer is suitable for some large landmark projects.

(4) The preparation process of the highly adaptable viscosity-reducing polycarboxylate water reducer of the present invention adopts a one-pot method, which achieves continuous production in the same reaction kettle; with high efficiency, short time, no use of any organic solvent, and environmental friendliness, the preparation process can be put into large-scale production easily.

DETAILED DESCRIPTION OF THE INVENTION

The preparation process of the highly adaptable viscosity-reducing polycarboxylate water reducer of the present invention will be detailed below by embodiments. These embodiments are given by way of illustration for the purpose that those familiar with this technology can understand the content of the present invention and implement it accordingly, but these embodiments in no way limit the scope of the present invention. All equivalent changes or modifications made according to the spirit of the present invention should be covered within the protection scope of the present invention.

The phenyl phosphate monomer B used in the embodiments of the present invention was self-made according to the patent CN 105646871A, the polyether macromonomer E was purchased from Xiamen Sinopeg Biotech Co., Ltd, and all other raw materials were commercially available ordinary analytical chemical reagents, purchased from Sinopharm Group Chemical Reagent Co., Ltd.

The serial numbers of some monomers B used in the embodiments of the present invention are as follows:

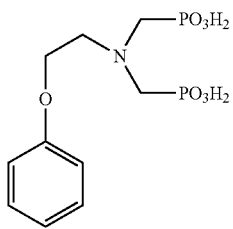
P-1

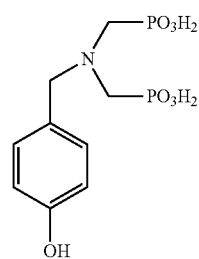
P-2

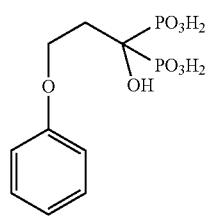
P-3

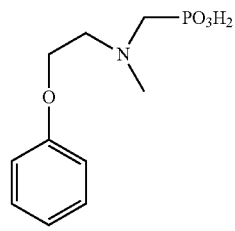
P-4

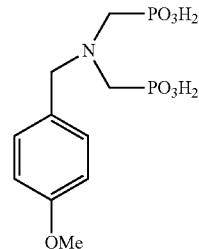
P-5

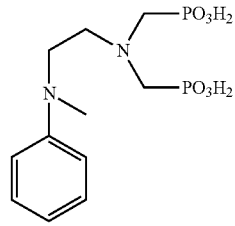
P-6

In the embodiments of the present invention, the weight-average molecular weights of the polymers were determined by gel permeation chromatographer of Wyatt technology corporation. (Gel column: Shodex SB806+803 two chromatographic columns in series; eluent: 0.1 M $NaNO_3$ solution; mobile phase velocity: 1.0 ml/min; detector: Shodex RI-7 refractive index detector; molecular weight standard: Polyethylene glycol GPC standard sample (Sigma-Aldrich, molecular weight: 1010000, 478000, 263000, 118000, 44700, 18600, 6690, 1960, 628, and 232).

Example 1

(1) Preparation of main chain: 138 g (1.0 mol) of o-hydroxybenzoic acid, 65 g (0.20 mol) of a phenyl phosphate monomer P-1, 6 g (0.10 mol) of ethylenediamine and 100 g of water were added to a four-necked flask equipped with a thermometer and a mechanical stirrer and mixed evenly, the flask was then put in a 100° C. constant-temperature oil bath, 114 g (1.4 mol) of 37% formaldehyde solution was dropwise added to the flask for 1 h and then the reaction was carried out for 7 h whiling holding the temperature, thus obtaining a main chain polymer;

(2) The introduction of side chains: the reaction flask was cooled to 30° C., 900 g (0.18 mol) of an epoxy-terminated polyether monomer with a molecular weight of 5000 was then added at a time, the reaction was carried out for 2 h while holding the temperature, 1200 g of water was then added for dilution to obtain the highly adaptable viscosity-reducing polycarboxylate water reducer. GPC test showed that the weight-average molecular weight $M_w$ was 39,200 and the molecular weight distribution coefficient was 2.05.

Example 2

(1) Preparation of main chain: 138 g (1.0 mol) of m-hydroxybenzoic acid, 124.8 g (0.40 mol) of a phenyl phosphate monomer P-2, 6 g (0.10 mol) of ethylenediamine and 160 g of water were added to a four-necked flask equipped with a thermometer and a mechanical stirrer and mixed evenly, the flask was then put in a 100° C. constant-temperature oil bath, 130 g (1.6 mol) of 37% formaldehyde solution was dropwise added to the flask for 1 h and then the reaction was carried out for 7 h whiling holding the temperature, thus obtaining a main chain polymer;

(2) The introduction of side chains: the reaction flask was cooled to 40° C., 600 g (0.15 mol) of an epoxy-terminated polyether monomer with a molecular weight of 4000 was then added at a time, the reaction was carried out for 2 h while holding the temperature, 850 g of water was then added for dilution to obtain the highly adaptable viscosity-reducing polycarboxylate water reducer. GPC test showed that the weight-average molecular weight $M_w$ was 34200 and the molecular weight distribution coefficient was 2.42.

Example 3

(1) Preparation of main chain: 138 g (1.0 mol) of p-hydroxybenzoic acid, 249.6 g (0.80 mol) of a phenyl phosphate monomer P-3, 30.9 g (0.30 mol) of diethylenetriamine and 100 g of water were added to a four-necked flask equipped with a thermometer and a mechanical stirrer and mixed evenly, the flask was then put in a 100° C. constant-temperature oil bath, 262 g (2.2 mol) of 37% acetaldehyde solution was dropwise added to the flask for 1 h and then the reaction was carried out for 9 h whiling holding the temperature, thus obtaining a main chain polymer;

(2) The introduction of side chains: the reaction flask was cooled to 50° C., 2400 g (0.60 mol) of an epoxy-terminated polyether monomer with a molecular weight of 4000 was then added at a time, the reaction was carried out for 2 h while holding the temperature, 2650 g of water was then added for dilution to obtain the highly adaptable viscosity-reducing polycarboxylate water reducer. GPC test showed that the weight-average molecular weight $M_w$ was 30500 and the molecular weight distribution coefficient was 2.34.

Example 4

(1) Preparation of main chain: 154 g (1.0 mol) of 2,3-dihydroxybenzoic acid, 294 g (1.2 mol) of a phenyl phosphate monomer P-4, 30.9 g (0.30 mol) of diethylenetriamine and 150 g of water were added to a four-necked flask equipped with a thermometer and a mechanical stirrer and mixed evenly, the flask was then put in a 100° C. constant-temperature oil bath, 348 g (2.4 mol) of 40% propionaldehyde solution was dropwise added to the flask for 1 h and then the reaction was carried out for 11 h whiling holding the temperature, thus obtaining a main chain polymer;

(2) The introduction of side chains: the reaction flask was cooled to 60° C., 2016 g (0.84 mol) of an epoxy-terminated polyether monomer with a molecular weight of 2400 was then added at a time, the reaction was carried out for 2 h while holding the temperature, 3350 g of water was then added for dilution to obtain the highly adaptable viscosity-reducing polycarboxylate water reducer. GPC test showed that the weight-average molecular weight $M_w$ was 26400 and the molecular weight distribution coefficient was 2.06.

Example 5

(1) Preparation of main chain: 154 (1.0 mol) of 3,4-hydroxybenzoic acid, 487.5 g (1.5 mol) of a phenyl phosphate monomer P-5, 81.6 g (0.60 mol) of m-xylylenediamine and 350 g of water were added to a four-necked flask equipped with a thermometer and a mechanical stirrer and mixed evenly, the flask was then put in a 120° C. constant-temperature oil bath, 219 g (2.7 mol) of 37% formaldehyde solution was dropwise added to the flask for 1 h and then the reaction was carried out for 11 h whiling holding the temperature, thus obtaining a main chain polymer;

(2) The introduction of side chains: the reaction flask was cooled to 70° C., 3600 g (1.5 mol) of an epoxy-terminated polyether monomer with a molecular weight of 2400 was then added at a time, the reaction was carried out for 4 h while holding the temperature, 4200 g of water was then added for dilution to obtain the highly adaptable viscosity-reducing polycarboxylate water reducer. GPC test showed that the weight-average molecular weight $M_w$ was 20,800 and the molecular weight distribution coefficient was 2.44.

Example 6

(1) Preparation of main chain: 138 g (1.0 mol) of o-hydroxybenzoic acid, 338 g (1.0 mol) of a phenyl phosphate monomer P-6, 92.7 g (0.90 mol) of diethylenetriamine and 300 g of water were added to a four-necked flask equipped with a thermometer and a mechanical stirrer and mixed evenly, the flask was then put in a 120° C. constant-temperature oil bath, 178.4 g (2.2 mol) of 37% formaldehyde solution was dropwise added to the flask for 1 h and then the reaction was carried out for 11 h whiling holding the temperature, thus obtaining a main chain polymer;

(2) The introduction of side chains: the reaction flask was cooled to 70° C., 5400 g (2.25 mol) of an epoxy-terminated polyether monomer with a molecular weight of 2400 was then added at a time, the reaction was carried out for 4 h while holding the temperature, 6600 g of water was then added for dilution to obtain the highly adaptable viscosity-reducing polycarboxylate water reducer. GPC test showed that the weight-average molecular weight $M_w$ was 29500 and the molecular weight distribution coefficient was 2.26.

Example 7

(1) Preparation of main chain: 138 g (1.0 mol) of m-hydroxybenzoic acid, 312 g (1.0 mol) of a phenyl phosphate monomer P-2, 72 g (1.20 mol) of ethylenediamine and 300 g of water were added to a four-necked flask equipped with a thermometer and a mechanical stirrer and mixed evenly, the flask was then put in a 120° C. constant-temperature oil bath, 178.4 g (2.2 mol) of 37% formaldehyde solution was dropwise added to the flask for 1 h and then the reaction was carried out for 11 h whiling holding the temperature, thus obtaining a main chain polymer;

(2) The introduction of side chains: the reaction flask was cooled to 50° C., 1440 g (1.2 mol) of an epoxy-terminated polyether monomer with a molecular weight of 1200 was then added at a time, the reaction was carried out for 3 h while holding the temperature, 2700 g of water was then added for dilution to obtain the highly adaptable viscosity-reducing polycarboxylate water reducer. GPC test showed that the weight-average molecular weight $M_w$ was 51,300 and the molecular weight distribution coefficient was 2.33.

Example 8

(1) Preparation of main chain: 138 g (1.0 mol) of p-hydroxybenzoic acid, 312 g (1.0 mol) of a phenyl phosphate monomer P-2, 90 g (1.5 mol) of ethylenediamine and 220 g of water were added to a four-necked flask equipped with a thermometer and a mechanical stirrer and mixed evenly, the flask was then put in a 130° C. constant-temperature oil bath, 170 g (2.1 mol) of 37% formaldehyde solution was dropwise added to the flask for 1 h and then the reaction was carried out for 14 h whiling holding the temperature, thus obtaining a main chain polymer;

(2) The introduction of side chains: the reaction flask was cooled to 40° C., 1125 g (2.25 mol) of a chlorine atom terminated polyether monomer with a molecular weight of 500 was then added at a time, the reaction was carried out for 4 h while holding the temperature, 1280 g of water was then added for dilution to obtain the highly adaptable viscosity-reducing polycarboxylate water reducer. GPC test showed that the weight-average molecular weight $M_w$ was 42,600 and the molecular weight distribution coefficient was 2.17.

Example 9

(1) Preparation of main chain: 138 g (1.0 mol) of o-hydroxybenzoic acid, 249.6 g (0.80 mol) of a phenyl phosphate monomer P-3, 73 g (0.50 mol) of triethylenetetramine and 200 g of water were added to a four-necked flask equipped with a thermometer and a mechanical stirrer and mixed evenly, the flask was then put in a 130° C. constant-temperature oil bath, 154 g (1.9 mol) of 37% formaldehyde solution was dropwise added to the flask for 1 h and then the reaction was carried out for 15 h whiling holding the temperature, thus obtaining a main chain polymer;

(2) The introduction of side chains: the reaction flask was cooled to 40° C., 4200 g (1.75 mol) of a chlorine atom terminated polyether monomer with a molecular weight of 2400 was then added at a time, the reaction was carried out for 3 h while holding the temperature, 4600 g of water was then added for dilution to obtain the highly adaptable viscosity-reducing polycarboxylate water reducer. GPC test showed that the weight-average molecular weight $M_w$ was 67,500 and the molecular weight distribution coefficient was 2.12.

Example 10

(1) Preparation of main chain: 138 g (1.0 mol) of o-hydroxybenzoic acid, 122.5 g (0.50 mol) of a phenyl phosphate monomer P-4, 18.9 g (0.10 mol) of tetraethylenepentamine and 150 g of water were added to a four-necked flask equipped with a thermometer and a mechanical stirrer and mixed evenly, the flask was then put in a 150° C. constant-temperature oil bath, 130 g (1.6 mol) of 37% formaldehyde solution was dropwise added to the flask for 1 h and then the reaction was carried out for 15 h whiling holding the temperature, thus obtaining a main chain polymer;

(2) The introduction of side chains: the reaction flask was cooled to 40° C., 1200 g (0.40 mol) of a bromine atom terminated polyether monomer with a molecular weight of 3000 was then added at a time, the reaction was carried out for 4 h while holding the temperature, 1850 g of water was then added for dilution to obtain the highly adaptable viscosity-reducing polycarboxylate water reducer. GPC test showed that the weight-average molecular weight $M_w$ was 79,200 and the molecular weight distribution coefficient was 2.40.

Comparative Example 1

240 g (0.10 mol) of methallyl polyoxyethylene ether with a molecular weight of 2400, 1.13 g (0.010 mol) of 30% hydrogen peroxide and 240 g of water were added into a four-necked flask equipped with a thermometer and a mechanical stirrer, and then the solution was sterred and heated to 40° C., a mixed solution consisting of 28.8 g (0.40 mol) of acrylic acid, 1.33 g (0.0125 mol) of 3-mercaptopropionic acid, 0.44 g (0.0025 mol) of L-ascorbic acid, and 30 g of water was dropwise added at 40° C. for 30 min, and then the resulting solution was maintained at this temperature for 1 h. The resulting product is a conventional polycarboxylate water reducer prepared by a conventional method in the laboratory. GPC test showed that $M_w$ was 31,700 and the molecular weight distribution coefficient was 1.82.

Comparative Example 2

Commercially available high-performance polycarboxylate water reducer, purchased from KZJ New Materials Group Co., Ltd. and having $M_w$ of 30,600 and the molecular weight distribution coefficient of 1.71, tested by GPC.

Comparative Example 3

A viscosity-reducing polycarboxylate water reducer synthesized with reference to CN 105367721 B, Example 4, having $M_w$ of 28,500 and a molecular weight distribution coefficient of 1.66, tested by GPC.

Comparative Example 4

A highly adaptable polycarboxylate water reducer synthesized with reference to CN 104177557 B, Example 2, having $M_w$ of 37,200 and a molecular weight distribution coefficient of 1.82, tested by GPC.

Application Example 1

According to the provisions in GB/T8077-2000 "Test Method for Homogeneity of Concrete Admixtures", the highly adaptable viscosity-reducing polycarboxylate water reducer synthesized in the examples of the present invention and the samples of the comparative examples were subjected to the measurement of the cement paste fluidity. It is specified that the water-cement ratio is 0.29 and the solid dosage of the polycarboxylate water reducer is 0.10%; the cement used in the test was Jiangnan-Onoda PII 52.5 cement. The results of cement paste are shown in table 1.

TABLE 1

Test results of cement paste fluidity

| Sample | Cement paste fluidity (mm) | | | |
|---|---|---|---|---|
| | 0 min | 20 min | 40 min | 60 min |
| Example 1 | 242 | 225 | 193 | 174 |
| Example 2 | 250 | 227 | 198 | 171 |
| Example 3 | 258 | 231 | 199 | 181 |
| Example 4 | 260 | 233 | 203 | 183 |
| Example 5 | 260 | 226 | 208 | 180 |
| Example 6 | 265 | 229 | 202 | 189 |
| Example 7 | 259 | 217 | 195 | 184 |
| Example 8 | 263 | 222 | 208 | 186 |
| Example 9 | 254 | 220 | 204 | 187 |
| Example 10 | 241 | 215 | 200 | 182 |
| Comparative Example 1 | 256 | 216 | 200 | 181 |
| Comparative Example 2 | 251 | 217 | 202 | 184 |
| Comparative Example 3 | 206 | 185 | 146 | 118 |

TABLE 1-continued

Test results of cement paste fluidity

| Sample | Cement paste fluidity (mm) | | | |
|---|---|---|---|---|
| | 0 min | 20 min | 40 min | 60 min |
| Comparative Example 4 | 219 | 176 | 139 | 112 |

It can be seen from the test data in Table 1 that under the same dosage and water-cement ratio conditions, the initial fluidity of the samples of the examples can reach 241-265 mm, and after 60 minutes the fluidity still can reach 171-189 mm; the liquidity loss is only about 30%. Compared with the conventional polycarboxylate water reducers in the comparative examples (Comparative Examples 1 and 2), the samples of the examples have similar initial fluidity and time-dependent fluidity; compared with the highly adaptable or viscosity-reducing water reducers synthesized according to the patents (Comparative Examples 3 and 4), the samples of the examples significantly has larger initial fluidity and time-dependent fluidity. This indicates that the highly adaptable viscosity-reducing polycarboxylate water reducers synthesized in the examples of the present invention have good initial dispersion and slump retention properties, and do not sacrifice water-reducing ability because of other excellent properties. Compared with the water reducers synthesized in the examples, the high-adaptability or viscosity-reducing water reducers synthesized according to the patents have poor water-reducing performance.

Application Example 2

According to the provisions of GB/T8077-2000 "Test Method for Homogeneity of Concrete Admixtures", it is specified that the water-cement ratio is 0.29 and the solid dosage of the polycarboxylate is 0.10%. Cements in different regions were selected, and the adaptability of the highly adaptable viscosity-reducing polycarboxylate water reducers synthesized in the examples of the present invention to different cement was investigated. Concrete paste results are shown in Table 2.

TABLE 2

Sensitivity test results of water reducers to different cement

| | Cement paste fluidity (mm) | | | | | | Relative standard deviation of liquidity (RSD, %) | |
|---|---|---|---|---|---|---|---|---|
| | Onoda concrete | | China United concrete | | Conch concrete | | | |
| Sample | 0 min | 60 min | 0 min | 60 min | 0 min | 60 min | 0 min | 60 min |
| Example 1 | 242 | 174 | 225 | 172 | 265 | 199 | 7.89 | 6.76 |
| Example 2 | 250 | 171 | 246 | 183 | 275 | 189 | 4.99 | 4.13 |
| Example 3 | 258 | 181 | 244 | 186 | 272 | 192 | 4.43 | 2.41 |
| Example 4 | 260 | 183 | 245 | 183 | 273 | 195 | 4.41 | 3.03 |
| Example 5 | 260 | 180 | 248 | 185 | 275 | 196 | 4.23 | 3.57 |
| Example 6 | 265 | 189 | 251 | 187 | 280 | 200 | 4.46 | 2.98 |
| Example 7 | 259 | 184 | 244 | 187 | 272 | 202 | 4.43 | 4.12 |
| Example 8 | 263 | 186 | 250 | 190 | 281 | 194 | 4.80 | 1.72 |
| Example 9 | 254 | 187 | 238 | 185 | 264 | 197 | 4.25 | 2.77 |
| Example 10 | 241 | 182 | 240 | 190 | 255 | 197 | 2.79 | 3.23 |
| Comparative Example 1 | 256 | 181 | 192 | 156 | 277 | 205 | 14.96 | 11.07 |
| Comparative Example 2 | 251 | 184 | 180 | 144 | 223 | 188 | 13.39 | 11.55 |
| Comparative Example 3 | 206 | 118 | 175 | 150 | 244 | 174 | 13.54 | 15.57 |
| Comparative Example 4 | 219 | 112 | 182 | 133 | 230 | 130 | 9.76 | 7.42 |

It can be seen from the test data in Table 2 that in three different cements, the samples of the examples are not quite different in term of fluidity, and the difference between the maximum fluidity and the minimum fluidity is less than 30 mm, which indicates that the highly adaptable viscosity-reducing polycarboxylate water reducers synthesized in the examples of the present invention have strong adaptability to different cement. Relative standard deviation (RSD) of fluidity is used to quantify the adaptability of a water reducer to cement. A large RSD of fluidity indicates that the product performance fluctuates greatly, indicating that the product has poor adaptability to different cement. For the initial fluidity, the RSDs of Examples 1-10 are between 2.79% and 7.89%. The RSD of Comparative Examples 1-3 is between 13.39% and 14.96%, which is nearly twice the maximum value of RSD (7.89%) of the examples. Comparative Example 4 (highly adaptable polycarboxylate water reducer synthesized according to the patent) has an RSD of 9.76%, which is twice the average RSD of the examples. For a 60 min fluidity, the RSD of the examples is between 1.72% and 6.76%. The RSD of Comparative Examples 1-3 is between 11.07% and 15.57%, which is much higher than that of the Examples, while the RSD of Comparative Example 4 is 7.42%, which is also higher than that of the Examples.

In summary, the adaptability of the highly adaptable viscosity-reducing polycarboxylate water reducers synthesized in the examples of the present invention to different cement is much stronger than that of conventional polycarboxylate water reducers, and also stronger than that of other highly adaptable polycarboxylate water reducers synthesized according to the patents.

Application Example 3

According to the provisions of GB/T8077-2000 "Test Method for Homogeneity of Concrete Admixtures", the fixed water-cement ratio is 0.50, the cement-sand ratio is 0.50, the solid dosage of the polycarboxylate is 0.12%. Three sand samples in different regions were selected, and the adaptability of the highly adaptable viscosity-reducing polycarboxylate water reducers synthesized in the examples of the present invention to different sands was investigated and the results are shown in Table 3. The cement used in the test was Onoda P II 52.5 cement. The specific parameters of the sand samples used were: Luoma Lake sand with a fineness modulus of 2.9; Mingguang machine-made sand with a fineness modulus of 2.5; Zhongshi river sand with fineness modulus of 2.7.

TABLE 3

Sensitivity test results of water reducers to different sands

| | Cement paste fluidity (mm) | | | | | | Relative standard deviation of liquidity (RSD, %) | |
| --- | --- | --- | --- | --- | --- | --- | --- | --- |
| | Luoma Lake sand | | Mingguang machine-made sand | | Zhongshi river sand | | | |
| Sample | 0 min | 60 min | 0 min | 60 min | 0 min | 60 min | 0 min | 60 min |
| Example 1 | 265 | 195 | 285 | 185 | 289 | 225 | 3.75 | 8.43 |
| Example 2 | 273 | 200 | 292 | 192 | 285 | 226 | 2.77 | 7.05 |
| Example 3 | 270 | 197 | 295 | 183 | 292 | 224 | 3.90 | 8.45 |
| Example 4 | 276 | 203 | 295 | 187 | 300 | 227 | 3.56 | 7.99 |
| Example 5 | 280 | 193 | 294 | 188 | 302 | 229 | 3.11 | 8.98 |
| Example 6 | 281 | 187 | 299 | 190 | 295 | 219 | 2.65 | 7.26 |
| Example 7 | 275 | 192 | 289 | 189 | 295 | 220 | 2.93 | 6.97 |
| Example 8 | 277 | 200 | 291 | 191 | 300 | 225 | 3.27 | 7.01 |
| Example 9 | 275 | 186 | 295 | 193 | 290 | 225 | 2.96 | 8.43 |
| Example 10 | 270 | 189 | 289 | 186 | 294 | 221 | 3.64 | 7.97 |
| Comparative Example 1 | 275 | 185 | 221 | 152 | 302 | 234 | 12.66 | 17.70 |
| Comparative Example 2 | 266 | 199 | 216 | 164 | 289 | 220 | 11.86 | 11.89 |
| Comparative Example 3 | 214 | 160 | 176 | 150 | 256 | 210 | 15.17 | 15.14 |
| Comparative Example 4 | 225 | 165 | 205 | 161 | 229 | 183 | 4.78 | 5.64 |

It can be seen from the test data in Table 3 that in the three different sand samples, the samples of the examples have the initial fluidity RSD of about 3% and the 60 min fluidity RSD of about 8%; the initial and 60 min fluidity RSDs of Comparative Examples 1-3 are both greater than 11%, much higher than those of the samples in the examples, which indicates that the highly adaptable viscosity-reducing polycarboxylate water reducers of the present invention have strong adaptability to different sand samples. Comparative Example 4 (the low-sensitivity polycarboxylate water reducer synthesized according to the patent) has both initial and 60 min fluidity RSDs being 4-6%, similar to the examples, but the fluidity of the sample of Comparative Example 4 in three different mortars is much less than that of the examples, indicating that Comparative Example 4 has good adaptability to sand samples, but its dispersibility is not competitive compared with the examples.

In summary, the adaptability of the highly adaptable viscosity-reducing polycarboxylate water reducers synthesized in the examples of the present invention to different sands is much stronger than that of conventional polycarboxylate water reducers, and the dispersibility of the highly adaptable viscosity-reducing polycarboxylate water reducers synthesized in the examples is also much higher than that of highly adaptable polycarboxylate water reducer synthesized according to the patent.

Application Example 4

By testing the apparent viscosity of the mortar, the viscosity-reducing performance of the highly adaptive viscosity-reducing polycarboxylate water reducers synthesized in the examples of the present invention was tested. The cement used in the mortar test was Onoda P II 52.5 cement, the sand sample used was ISO standard sand, and the cement-sand ratio was maintained at 0.8. Each water reducer sample was subjected to three parallel tests according to the water-cement ratios of 0.18, 0.20, and 0.22. By adjusting the dosage of water reducers, the initial fluidity of each mortar was kept within 320±5 mm. PXP-I defoamer produced by Jiangsu Subote New Materials Co., Ltd. was used to control the air content of each mortar to be basically the same, so as to ensure the comparability of different mortar samples. The Model R/S SST2000 rheometer produced by Brookfield Company of the United States was used to test the apparent viscosity of each mortar sample, and the results are shown in Table 4. The specific test method can refer to the Reference (Journal of Materials in Civil Engineering, 2016: 04016085).

TABLE 4

Test results of apparent viscosity of mortar

| Sample | Apparent viscosity of mortar (Pa · s) | | |
|---|---|---|---|
| | Water-cement ratio 0.18 | Water-cement ratio 0.20 | Water-cement ratio 0.22 |
| Example 1 | 40.5 | 18.4 | 6.5 |
| Example 2 | 43.2 | 17.9 | 6.0 |
| Example 3 | 41.7 | 16.5 | 5.8 |
| Example 4 | 42.5 | 17.2 | 6.7 |
| Example 5 | 42.8 | 16.4 | 6.5 |
| Example 6 | 43.0 | 15.8 | 6.6 |
| Example 7 | 41.9 | 16.3 | 7.1 |
| Example 8 | 41.8 | 17.1 | 6.5 |
| Example 9 | 42.5 | 16.9 | 6.0 |
| Example 10 | 43.0 | 18.0 | 7.2 |
| Comparative Example 1 | 60.2 | 27.9 | 13.8 |
| Comparative Example 2 | 63.5 | 38.1 | 14.1 |
| Comparative Example 3 | 49.3 | 21.6 | 9.6 |
| Comparative Example 4 | 66.5 | 30.5 | 15.6 |

It can be seen from the test data in Table 4 that when the water-cement ratio is equal to 0.18, the apparent viscosity of the mortar samples of the examples is between 40.5 and 43.2 Pa·s, while Comparative Example 3 (the viscosity-reducing polycarboxylate water reducer synthesized according to the patent) is 49.3 Pa·s, and the apparent viscosity of the other three comparative sample mortars is between 60.2 Pa·s and 66.5 Pa·s, which indicates that the viscosity-reducing performance of the highly adaptable viscosity-reducing polycarboxylate water reducers synthesized in the examples of the present invention is far superior to that of the conventional polycarboxylate water reducers. Although Comparative Example 3 has a certain viscosity-reducing function, the effect is inferior to that of the present invention. The apparent viscosity results of mortars with water-cement ratios of 0.20 and 0.22 have similar conclusions, that is, the viscosities of Examples 1 to 10< the viscosity of Comparative Example 3<the viscosities of Comparative Examples 1, 2, and 4

In summary, the highly adaptable viscosity-reducing polycarboxylate water reducers synthesized in the examples of the present invention have excellent viscosity-reducing function and can effectively reduce the apparent viscosity of cement mortar.

Application Example 5

Next, according to the method specified in GB8076-2008, the viscosity reducing effect of the highly adaptable viscosity-reducing polycarboxylate water reducers of the present invention on high-strength concrete was tested. The cement used in the test was Onoda P II 52.5 cement, the ore powder was S95 ore powder, the fly ash was grade I fly ash, silica fume was Tiankai silica fume with a specific surface area of 16,500 m$^2$/kg, and sand was Zhongshi river sand with a fineness modulus of 2.7, and the stone was 5-20 mm continuously graded gravel. The test was carried out for 2 groups, which are concrete with strength grades C50 and C100. The mix ratio of C50 concrete is: cement: 368; ore powder: 92; fly ash: 46; sand: 672; stone: 1096; water: 152; and the mix ratio of C100 concrete is: cement: 540: ore powder: 150; silica fume: 60, sand: 620: stone: 930: water: 150. The dosage of the water reducer was adjusted so that the initial slump of the concrete is controlled within 24±0.3 cm, and the air content of the concrete was controlled within 3.5±0.5%, so as to ensure the comparability of the test of each group. The viscosity of concrete is quantified by measuring the empty time of the inverted slump cylinder. The specific method is as follows: the slump cylinder is put upside down and capped at the bottom, filled with concrete and smoothed (generally the inverted slump cylinder is fixed on a bracket, and its bottom is 50 cm above the ground), the bottom cap is slid off quickly to test the empty time of concrete with a stopwatch. The test results of concrete are shown in Table 5.

TABLE 5

Test results of empty time of concrete sample

| Sample | Empty time of concrete (s) | |
|---|---|---|
| | C50 | C100 |
| Example 1 | 9.6 | 14.3 |
| Example 2 | 7.3 | 15.0 |
| Example 3 | 8.6 | 15.1 |
| Example 4 | 7.7 | 14.6 |
| Example 5 | 7.2 | 13.5 |
| Example 6 | 7.0 | 12.4 |
| Example 7 | 6.5 | 13.3 |
| Example 8 | 7.5 | 14.5 |
| Example 9 | 8.1 | 15.5 |
| Example 10 | 9.1 | 14.0 |
| Comparative Example 1 | 13.6 | 24.9 |
| Comparative Example 2 | 15.2 | 25.5 |
| Comparative Example 3 | 11.2 | 19.1 |
| Comparative Example 4 | 16.4 | 28.5 |

Based on the statistics of the empty time data of concrete in Table 5, it is found that in C50 concrete, the samples of Examples 1 to 10 have the empty time of 6.5 s to 9.6 s and the average empty time of 7.2 s, while Comparative Examples 1, 2, and 4 have the empty time of 12.4 s to 15.1 s and the average empty time of 13.3 s, and Comparative Example 3 has the empty time of 11.2 s; in C100 concrete, the samples of Examples 1 to 10 have the empty time of 12.4 s to 15.5 s and the average empty time of 14.2 s, while Comparative Examples 1, 2, and 4 have the empty time of 24.9 s and 28.5 s and the average empty time of 26.3 s, and Comparative Example 2 has the empty time of 19.1 s. That is, regardless of C50 or C100 concrete, the empty time comparison result is always as follows: Examples 1 to 10 <Comparative Example 3<Comparative Examples 1, 2, and 4, which is consistent with the test results of the apparent viscosity of the mortar in Application Example 4, indicating that the highly adaptable viscosity-reducing polycarboxylate water reducers synthesized in the examples of the present invention have excellent viscosity-reducing function.

What is claimed is:

1. A viscosity-reducing polycarboxylate water reducer, comprising a polymer and water,
the polymer accounts for 30-50 wt %;
the polymer has polyether side chains,
a main chain of the polymer
contains a hydrophobic benzene ring and hydrophilic amine, soluble in an aqueous solution, and
is having two adsorption groups, carboxyl group and phosphono group;
wherein the main chain is prepared through a polycondensation reaction among an aromatic compound, a polyamine compound, and an alkyl aldehyde;
the aromatic compound includes hydroxybenzoic acid and phenylphosphonic acid monomers, and the aromatic compound and the polyamine compound are randomly distributed in the main chain.

2. The viscosity-reducing polycarboxylate water reducer according to claim 1, wherein the hydroxybenzoic acid is any one of o-hydroxybenzoic acid, m-hydroxybenzoic acid, p-hydroxybenzoic acid, 2,3-dihydroxybenzoic acid, and 3,4-dihydroxybenzoic acid or a combination of more than two of o-hydroxybenzoic acid, m-hydroxybenzoic acid, p-hydroxybenzoic acid, 2,3-dihydroxybenzoic acid, and 3,4-dihydroxybenzoic acid in any ratio.

3. The viscosity-reducing polycarboxylate water reducer according to claim 1, wherein the phenylphosphonic acid monomer is represented by a structural formula B-1 or B-2:

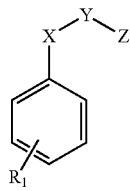

B-1

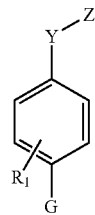

B-2 wherein X represents O or $NR_2$, Y represents alkylene with 1 to 4 carbon atoms, Z represents $N(CH_2PO_3H_2)_2$, $NHCH_2PO_3H_2$, $NR_3CH_2PO_3H_2$, $C(OH)(PO_3H_2)_2$, $CH(OPO_3H_2)CH_2OPO_3H_2$ or $OPO_3H_2$,
$R_1$ represents alkyl with 1 to 4 carbon atoms, G represents OH or $NR_4$, and $R_2$, $R_3$, and $R_4$ independently represent alkyl with 1 to 4 carbon atoms.

4. The viscosity-reducing polycarboxylate water reducer according to claim 1, wherein the polyamine compound is any one of m-xylylenediamine, ethylenediamine, diethylenetriamine, triethylenetetramine, and tetraethylenepentamine or a combination of more than two of m-xylylenediamine, ethylenediamine, diethylenetriamine, triethylenetetramine, and tetraethylenepentamine in any ratio.

5. The viscosity-reducing polycarboxylate water reducer according to claim 1, wherein the alkyl aldehyde is formaldehyde, acetaldehyde, propionaldehyde, or the alkyl aldehyde is paraformaldehyde.

6. The viscosity-reducing polycarboxylate water reducer according to claim 1, wherein the weight-average molecular weight $M_w$ of the viscosity-reducing polycarboxylate water reducer is between 20,000 and 80,000.

7. A method to prepare the viscosity-reducing polycarboxylate water reducer according to claim 6, wherein a linear main chain polymer is first prepared by a polycondensation reaction from monomer A, monomer B, monomer C, and aldehyde D, and then polyether macromonomer E is grafted onto the main chain through chemical bonding to form a comb-shaped polymer, thereby obtaining the viscosity-reducing polycarboxylate water reducer;
the monomer A is hydroxybenzoic acid,
the monomer B is a phenylphosphonic acid monomer, the monomer C is a polyamine compound,
the aldehyde D is an alkyl aldehyde;
the polyether macromonomer E is a polyethylene glycol monomethyl ether containing a special group at the end, which is presented by a structural formula E-1 or E-2:

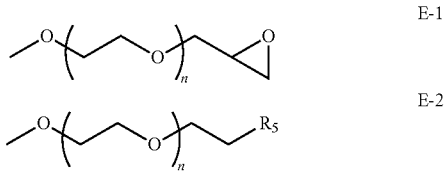

wherein $R_5$ represents Cl or Br, n represents the number of repeating units with the specific value of 11-113, and the molecular weight of the polyether macromonomer E is 500-5000;
the ends of the polyether macromonomer E contain epoxy or halogen groups which can react with the active hydrogen on the amino group, so that the polyether monomer E can be grafted onto the polymer main chain containing the amino group.

8. The method according to claim 7, wherein the preparation method of the viscosity-reducing polycarboxylate water reducer specifically has the following two steps:

(1) preparing main chain: adding monomer A, monomer B, monomer C and water to a reaction flask, mixing evenly, heating to 100-150° C., and then dropwise adding an aqueous solution of aldehyde D to the reaction system, and reacting for 8-16 h to obtain a main chain polymer, wherein the molar ratio of the monomer A to monomer B to monomer C is 1:0.2-1.5: 0.1-1.5; the molar amount of the aldehyde D is 105-110% of the total molar amount of the monomers A, B, and C;
the water accounts for 20-60 wt % of the total mass of the monomers A, B, and C (2) introducing side chains: cooling the main chain polymer prepared in step (1) to 30-80° C., and then adding the polyether macromonomer E, holding the temperature and carrying out the reaction for 2-6 hours to obtain the viscosity-reducing polycarboxylate water reducer, wherein the molar ratio of the polyether macromonomer E to the monomer C in step (1) is 1-4:1.

9. A method of using a viscosity-reducing polycarboxylate water reducer, comprising
providing the viscosity-reducing polycarboxylate water reducer according to claim 6, wherein the dosage of the viscosity-reducing polycarboxylate water reducer is 0.05% to 0.3% of a mass of a mixture of cementitious materials, the dosage refers to the pure solid dosage, and the percentage refers to the mass percentage; the viscosity-reducing polycarboxylate water reducer can be used together with other commercially available water reducers, such as lignosulfonate water reducers, naphthalene sulfonate water reducers, polycarboxylate water reducers, and can also be used after being mixed with an air-entraining agent, a retarder, an early strength agent, an expanding agent, a tackifier, a shrinkage reducing agent and a defoaming agent.

\* \* \* \* \*